United States Patent [19]

Markezich

[11] Patent Number: 4,613,651
[45] Date of Patent: Sep. 23, 1986

[54] FIRE RETARDANT THERMOPLASTIC POLYESTER AND POLYESTERETHER COMPOSITIONS

[75] Inventor: Ronald I. Markezich, Williamsville, N.Y.

[73] Assignee: Occidental Chemical Corporation, Niagara Falls, N.Y.

[21] Appl. No.: 740,600

[22] Filed: Jun. 3, 1985

Related U.S. Application Data

[62] Division of Ser. No. 633,563, Jul. 23, 1984.

[51] Int. Cl.⁴ .......................................... C08L 67/02
[52] U.S. Cl. ...................... 525/42; 525/408; 524/89; 524/411
[58] Field of Search .............. 524/89, 411; 525/42, 525/408

[56] References Cited

U.S. PATENT DOCUMENTS

| | | | |
|---|---|---|---|
| 3,734,758 | 5/1973 | Cyba | 524/89 |
| 3,748,340 | 7/1973 | Hayes | 524/94 |
| 4,315,882 | 2/1982 | Hiratsuka | 264/171 |
| 4,374,220 | 2/1983 | Sonnenberg | 524/94 |

Primary Examiner—John C. Bleutge
Assistant Examiner—Patricia Short
Attorney, Agent, or Firm—James F. Tao; William G. Gosz

[57] ABSTRACT

Thermoplastic polyester and polyesterether compositions having improved flame retardance, smoke generation and heat aging, reduced blooming and superior high temperature processability comprise a thermoplastic polyester or polyesterether resin derived from 1,4-butanediol and dimethyl terephthalate, antimony oxide, optionally fiberglass, and a chlorinated bisimide of the formula

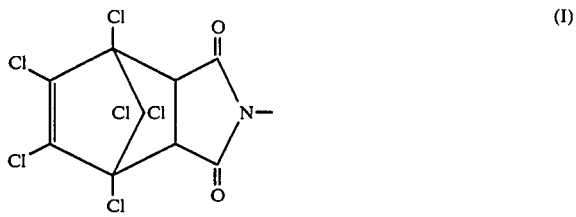

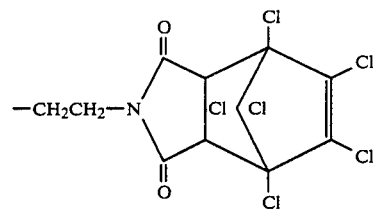

or

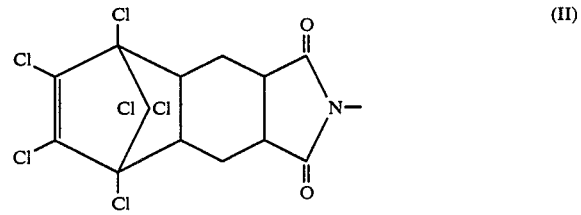

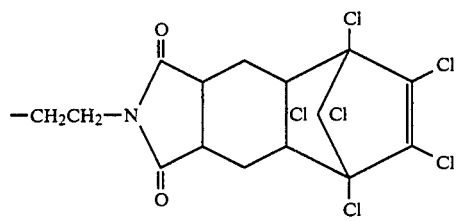

4 Claims, No Drawings

FIRE RETARDANT THERMOPLASTIC POLYESTER AND POLYESTERETHER COMPOSITIONS

This is a division of application Ser. No. 633,563 filed July 23, 1984.

BACKGROUND OF THE INVENTION

The present invention relates to flame retardant polyester and polyesterether compositions which have significantly reduced blooming of the flame retardant after molding, high temperature processability, reduced smoke generation, and superior heat aging.

Thermoplastic polyesters and polyesterethers have become increasingly important in recent years due to their excellent processability and superior mechanical, chemical and electrical properties. Exemplary of such thermoplastic polyesters is poly(butylene terephthalate) (PBT), which is prepared by the reaction of 1,4-butanediol and dimethyl terephthalate. PBT is commercially available from a variety of domestic and foreign sources. The physical properties of PBT, such as tensile and flexural strength and heat deflection temperature, are significantly enhanced by the addition of fiberglass to the composition.

A representative thermoplastic polyesterether is Hytrel®, which is manufactured and sold by the duPont Company. This material is a copolyester which is prepared by the reaction of dimethyl terephthalate, polyether glycol, and excess 1,4-butanediol. Hytrel® is an elastomer which has superior tensile and flexural strength, abrasion resistance, and good electrical properties.

Many commercial uses for thermoplastic polyesters and polyesterethers require a level of flame retardancy not present in the base resin. Such compositions are desired for applications such as in home construction, automobile and air craft manufacture, packaging, electrical equipment, and the like. To meet this demand, a wide variety of halogenated compounds have been used in these compositions to impart flame retardancy. Unfortunately, however, the addition of flame retardants to the resin has been at the expense of other physical properties which render the resin desirable, such as superior toughness and strength. Specifically, the use of conventional flame retardant additives can cause decreased flexural strength and heat distortion resistance, particularly in glass filled compositions. Accordingly, a flame retardant additive must be carefully selected not only on the basis of its principal function, i.e. flame retardancy, but also with regard to its effect on the other physical properties of the polymer composition.

Many widely used flame retardants for PBT resin compositions, such as decabromodiphenyl ether, have a tendency to migrate to the surface of the molded article. This tendency, known as "blooming", represents a physical loss of the flame retardant from the molded article and can result in a breakdown in the surface electrical characteristics of the molded part. See U.S. Pat. No. 4,373,047 which discusses this phenomenon and discloses the addition of an olefin polymer or copolymer to such compositions in order to reduce blooming of the flame retardant.

The high processing temperatures required for molding thermoplastic polyester and polyesterether compositions also place constraints on the flame retardant additive which can be employed. Such processing temperatures are required to reduce cycle times, but often preclude the use of thermally unstable additives. Thermal instability can result in a deterioration in surface appearance as evidenced by an unsatisfactory color change in the molded article.

It is also highly desirable to further improve upon other physical properties of the composition such as smoke generation and heat aging.

Chlorinated bisimides such as those of the present invention have been disclosed as effective flame retardant additives for various polymers such as ABS and polyolefins. See, for instance, the disclosures in U.S. Pat. No. 4,374,220, issued Feb. 15, 1983, U.S. Pat. No. 3,877,974, issued Apr. 15, 1975, U.S. Pat. No. 3,734,758, issued May 22, 1973, and British Published Application No. 1,287,934, published Sept. 6, 1972. However, none of these references discloses the use of the chlorinated bisimides of the present invention as flame retardants in thermoplastic polyesters or polyesterethers. Moreover, none of these references suggest that the incorporation of such chlorinated bisimides in these resins would also reduce or eliminate blooming, reduce thermal degradation under high temperature processing conditions significantly reduce smoke generation, and provide better heat aging.

It is therefore a principal object of the present invention to provide superior non-blooming, flame retardant thermoplastic polyester and polyesterether compositions which possess excellent processability and physical properties.

SUMMARY OF THE INVENTION

In accordance with the present invention, thermoplastic polyester and polyesterether compositions are provided having improved flame retardance, smoke generation and heat aging, resistance to blooming, and high temperature processability.

The thermoplastic polyester compositions comprise, in percent by weight, (a) from about 40% to about 75% of PBT, (b) from about 0 to about 10% of antimony trioxide, (c) from about 0 to about 35% of glass fiber, and (d) from about 5% to about 20% of a chlorinated bisimide selected from the group consisting of

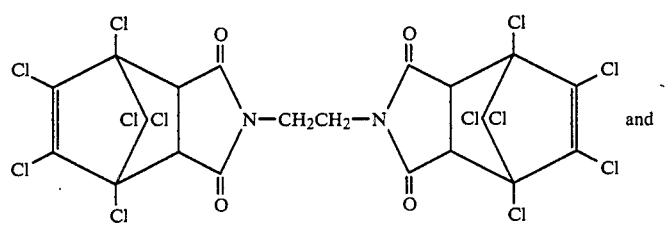

(I)

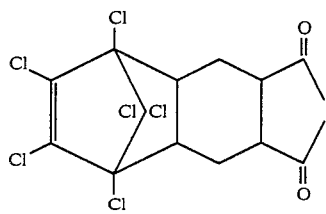 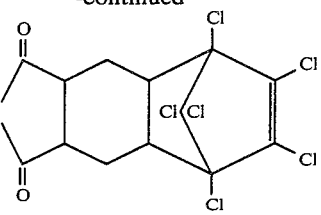

(II)

The thermoplastic polyesterether compositions comprise, in percent by weight, (a) from about 50% to about 90% of a polyesterether elastomer prepared from dimethyl terephthalate, polyether glycol, and 1,4-butanediol, (b) from about 0 to about 40% of antimony tance, and good electrical properties. See Kirk-Othmer, *Encyclopedia of Chemical Technology*, 3rd Edition, Volume 8, pp. 636–638 (1982).

The flame retardant additives of this invention are chlorinated bisimides having the following formulas

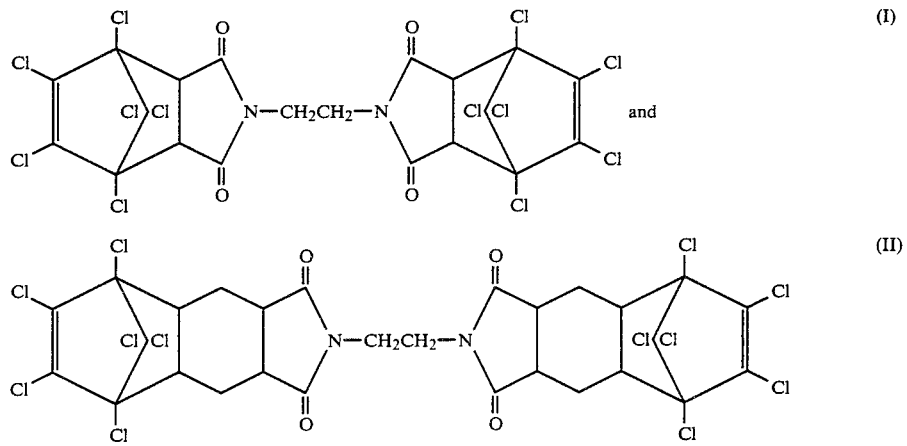

trioxide, and (c) from about 5% to about 60% of a chlorinated bisimide selected from the group consisting of compounds (I) and (II).

DESCRIPTION OF THE PREFERRED EMBODIMENTS

The thermoplastic polyesters and polyesterethers suitable for use in the compositions of this invention are high performance plastics which are well known for their superior physical and chemical properties.

Suitable thermoplastic polyesters are prepared by the ester interchange reaction of 1,4-butanediol and dimethyl terephthalate, followed by polymerization at high temperatures under vacuum with removal of excess butanediol. The resulting thermoplastic polyester is characterized by sequences of repeating tetramethylene terephthalate units and is commonly referred to by the generic name PBT (poly(butylene terephthalate)). The properties of PBT are enhanced by incorporating glass fiber in the molding composition which results in increased strength, flexural modulus, heat deflection temperature, and UL temperature index. See Kirk-Othmer, *Encyclopedia of Chemical Technology*, 3rd Edition, Volume 18, pp. 549–570 (1982).

Suitable thermoplastic polyesterethers are prepared by the catalyzed melt transesterification reaction of a mixture of dimethyl terephthalate, polyether glycol, and excess 1,4-butanediol. Representative of such polyesterethers is Hytrel®, which is manufactured and sold by the duPont Company. Hytrel® polymers are elastomeric block copolymers having repeating units of tetramethylene terephthalate and poly(alkylene ether terephthalate). Thermoplastic polyesterethers have superior tensile and tear strength, flex life, abrasion resis- The chlorinated bisimide of formula (I) can be prepared by the reaction of chlorendic anhydride and ethylene diamine. See U.S. Pat. No. 4,374,220, issued Feb. 15, 1983 to Sonnenberg, the pertinent portions of which are incorporated herein by reference. The preparation of this compound is more fully described in Example 1 below. In accordance with accepted international chemical nomenclature, this compound is designated as 2,2'-(1,2-ethanediyl)bis[4,5,6,7,8,8-hexachloro-3a,4,7,7a-tetrahydro-(9Cl)]-4,7-methano-1H-isoindol-1,3(2H)-dione.

The compound of formula (II) can also be prepared by reacting hexolic anhydride and ethylene diamine. See U.S. Pat. No. 3,748,340, issued July 24, 1973 to Haze et al., the pertinent disclosure of which is incorporated herein by reference. The preparation of this compound is illustrated in Example 2 below. This compound is designated as 2,2'-(1,2-ethanediyl) bis[5,6,7,8,10,10-hexachloro-3a,4,8,8a,9,9a,-hexahydro-(9Cl)]-5,8-methano-1H-benz[F]isoindole-1,3(2H)-dione.

The thermoplastic polyester compositions of this invention comprise from about 40% to about 75%, and preferably about 50% to about 60%, by weight of PBT, and from about 5% to about 20%, preferably about 10% to about 15%, by weight of chlorinated bisimide. Antimony trioxide, in an amount of from about 0 to about 10% by weight, is also added to the molding composition as a synergist for enhanced flame retardancy. PBT molding compositions also typically include a substantial amount of glass fibers for improved physical properties, and the molding compositions of this invention can also include from about 0 to about 35% by weight of glass fibers.

The thermoplastic polyesterether compositions of the present invention comprise from about 50% to about 90%, preferably from about 70% to about 90%, by weight of polyester-ether, and from about 5% to about 60%, preferably from about 10% to about 15%, by weight of chlorinated bisimide. Antimony trioxide is also present in the molding composition as a synergistic flame retardant additive in an amount of from about 0 to about 40% by weight. The molding composition based on a polyesterether resin is an elastomer and does not normally include glass fiber.

The components of the molding compositions as described above can be compounded to form an intimate mixture suitable for molding by various techniques known in the art. The components may be ground or pulverized, and the powder mixed in a conventional fashion to form a blend suitable for molding. Alternatively, the fire retardant components may be added and mixed with a molten polymer blend. the blend may then be molded, extruded, or otherwise formed into useful articles or shapes.

The molding compounds are particularly adaptable for injection molding techniques. Furthermore, various other additives may be incorporated into the blend such as plasticizers, lubricants, fillers, dyes, pigments, mold-release agents, antistatic agents, and the like.

The molding compositions of the present invention offer the particular advantage of being resistant to blooming after being formed into a molded article. Resistance to blooming is an indication that the flame retardant is retained within the molded article and not exuded from the surface. Good resistance to blooming is essential for molded articles which must meet stringent UL requirements for self-extinguishing compositions, and such articles are most frequently found in electrical applications. This resistance to blooming is surprising in view of the ease with which blooming occurs in compositions using related flame retardants such as decabromodiphenyl ether, decabromodiphenyl oxide, and Dechlorane Plus ®.

A further advantage of the particular chlorinated bisimide designated by formula (II) is that thermoplastic polyester and polyesterether compositions containing this compound have outstanding thermal stability when molded at elevated temperatures, i.e. 450° F. to 500° F. Such elevated molding temperatures are advantageous since they result in reduced cycle times and more efficient molding operations. The enhanced thermal stability of compositions using the chlorinated bisimide of formula (II) is surprising in view of the relative instability of compositions using the chlorinated bisimide of formula (I).

Still another advantage of the present molding compositions is their reduced smoke generation and superior heat aging in comparison to analogous materials such as the brominated bisimides disclosed in U.S. Pat. No. 4,374,220.

The following examples are provided to further illustrate this invention and the manner in which it may be carried out. It will be understood, however, that the specific details given in the examples have been chosen for purposes of illustration only and are not to be construed as limiting the invention. In the examples, unless otherwise indicated, all parts and percentages are by weight and all temperatures are in degrees Celsius.

Examples 1 and 2 illustrate, respectively, the preparation of 2,2'-(1,2-ethanediyl)bis[4,5,6,7,8,8-hexachloro-3a,4,7,7a-tetrahydro-(9Cl)]-4,7-methano-isoindol-1,3(2H)-dione and 2,2'-(1,2-ethanediyl)bis[5,6,7,8,10,10-hexachloro-3a,4,8,8a,9,9a-hexahydro-(9Cl)]-5,8-methane-1H-benz[F]isoindol-1,3(2H)-dione.

EXAMPLE 1

Following the procedure of U.S. Pat. No. 4,374,220, 0.22 moles of chlorendic anhydride, 0.11 moles of ethylene diamine and 500 ml. of xylene were added to a 1 liter flask equipped with a nitrogen purge, a heating mantle, a mechanical stirrer, a reflux condenser and a Dean-Stark apparatus. The mixture was refluxed for ½ hour during which time 3.2 mls. of water was collected. The reaction mixture was cooled and filtered to give 68% yield of white crystals having a melting point of 354° C.–356° C.

EXAMPLE 2

Following the procedure of U.S. Pat. No. 3,748,340, 1500 ml. of toluene and 425 grams (1.0 moles) of hexolic anhydride were added to a 3 liter flask provided with a Dean-Stark water trap, stirrer and heating mantle. 30 grams (0.5 moles) of ethylene diamine in 200 ml. of toluene was added dropwise to this mixture over a period of about 10 minutes, the temperature rising to 39° C. Heat was applied to the reaction mixture and the mixture was allowed to reflux. After refluxing for 8 hours, the reaction mixture was filtered hot and 276 grams of white, powdery crystals were obtained.

Example 3 is a control example illustrating the preparation of a molding compound using a Hytrel ® resin and Dechlorane Plus ®*.

*Dechlorane Plus is a flame retardant which is manufactured and sold by the Occidental Chemical Corporation

EXAMPLE 3

100 parts of Hytrel ® was mixed with 20 parts of Dechlorane ® Plus, 5 parts of antimony oxide, and 0.25 parts of carbon black, milled on a 2-roll mill to mix the materials, and then molded at 340° F. into test bars on an injection molding machine. After molding, the samples were heat aged at 120° C. for up to 4 weeks. After aging for one week, visual inspection showed a white powder on the surface of the test bars which is indicative of bloom. The bloom got worse upon further heat aging for up to 4 weeks.

Examples 4 and 5 illustrate the preparation of molding compounds according to the present invention using a Hytrel ® resin and the flame retardants of Examples 1 and 2, respectively.

EXAMPLE 4

100 parts of Hytrel ® was mixed with 16 parts of the compound of Example 1, 4 parts of antimony oxide and 1 part of carbon black, milled on a 2-roll mill to mix the material, and then molded at 340° F. into test bars on an injection molding machine. After molding the samples were heat aged at 120° C. for up to 4 weeks. No bloom on the samples was detected.

EXAMPLE 5

100 parts of Hytrel ® was mixed with 12 parts of the compound of Example 2, 3 parts of antimony oxide and 1 part of carbon black, milled on a 2-roll mill to mix the material, and then molded at 340° F. into test bars on an injection molding machine. After molding the samples were heat aged at 120° C. for up to 4 weeks. No bloom on the samples was detected.

Following the procedure of Examples 3, 4 and 5, injection molded test bars were prepared using Hytrel ® and various amounts of flame retardant, and evaluated for flame retardance, bloom and other physical properties. The results are shown in Table 1. These results demonstrate that the flame retardant additives of this invention do not bloom and are therefore superior to the flame retardant additives of the prior art.

TABLE 1

| | EXAMPLES | | | | | | |
|---|---|---|---|---|---|---|---|
| | 3 | 4 | 5 | 6 | 7 | 8 | 9 |
| Composition | | | | | | | |
| Hytrel ® 4056 (parts) | 100 | 100 | 100 | 100 | 100 | 100 | 100 |
| Dechlorane Plus ® (parts) | 20 | — | — | — | — | 50 | 60 |
| Example 1 (parts) | — | 16 | — | 12 | — | — | — |
| Example 2 (parts) | — | — | 12 | — | — | — | — |
| $Sb_2O_3$ (parts) | 5 | 4 | 3 | 3 | — | 12.5 | 15 |
| Carbon Black (parts) | 1 | 1 | 1 | 1 | 1 | 1 | 1 |
| Properties | | | | | | | |
| UL-94 $\frac{1}{8}''$ | V-2 | V-2 | V-2 | V-2 | No | V-0 | V-0 |
| 300% Modulus (psi) | 1146 | 1285 | 1278 | 1261 | 1396 | 991 | 932 |
| Tensile Strength (psi) | 2680 | 2586 | 2922 | 3239 | 2777 | 1566 | 1383 |
| Elongation (%) | 737 | 690 | 696 | 720 | 570 | 654 | 606 |
| Bloom | Yes | No | No | No | — | No | No |

Examples 10 and 11 illustrate the effect of molding temperature on the thermal stability of the molding compound. A change in color of the molded test bar indicates thermal degradation.

EXAMPLE 10

100 parts of Hytrel ®, 12 parts of the compound of Example 1, and 3 parts of antimony oxide were mixed and molded into test bars at various temperatures ranging from 340° F. up to 500° F. The results are set forth below

| Molding Temperature | Sample Color |
|---|---|
| 340° F. | Off-white |
| 400° F. | Off-white |
| 450° F. | Off-white |
| 500° F. | Gray |

EXAMPLE 11

Following the procedure of Example 10, 100 parts of Hytrel ®, 12 parts of the compound of Example 2, and 3 parts of antimony oxide were mixed and molded into test bars at various temperatures ranging from 340° F. up to 500° F. The results are set forth below

| Molding Temperature | Sample Color |
|---|---|
| 340° F. | Off-white |
| 400° F. | Off-white |
| 450° F. | Off-white |
| 500° F. | Off-white |

A comparison of the results of Examples 10 and 11 indicates that thermoplastic polyesterether molding compounds containing the flame retardant of Example 2 have more thermal stability than those using the flame retardant of Example 1.

Examples 12 and 13 are control examples illustrating the preparation of molding compounds using a PBT resin, and Dechlorane Plus ® and decabromodiphenyl oxide, respectively. Examples 14 and 15 illustrate the preparation of molding compounds according to the present invention using a PBT resin and the flame retardants of Examples 1 and 2, respectively.

EXAMPLE 12

A mixture containing, in weight percent, 56% PBT, 30% glass fiber, 10.5% Dechlorane Plus ®, 3.5% antimony oxide and 1% carbon black was extruded into pellets. The pellets were molded into test bars and heat aged at 120° C. for 4 days. Blooming was observed on these samples.

EXAMPLE 13

A mixture containing, in weight percent, 56% PBT, 30% glass fiber, 10.5% decabromodiphenyl oxide, 3.5% antimony oxide, and 1% carbon black was extruded into pellets. These pellets were molded into test bars and heat aged at 120° C. for 4 days. Blooming was observed on these samples.

EXAMPLE 14

A mixture containing, in weight percent, 56% PBT, 30% glass fiber, 10.5% of the flame retardant of Example 1, 3.5% antimony oxide, and 1% carbon black was extruded into pellets. These pellets were molded into test bars and heat aged at 120° C. for 4 days. Blooming was not observed on these samples.

EXAMPLE 15

A mixture containing, in weight percent, 54% PBT, 30% glass fiber, 12% of the flame retardant of Example 2, 4% antimony oxide, and 1% carbon black was extruded into pellets. These pellets were molded into test bars and heat aged at 120° C. for 4 days. Blooming was not observed on these samples.

Following the procedure of Examples 12, 13, 14 and 15, injection molded test bars were prepared using PBT and various amounts of flame retardant, and evaluated for flame retardance, bloom, and other physical properties. The results are shown in Table 2. These results demonstrate that the flame retardant additives of this invention do not bloom and are therefore superior to the flame retardant additives of the prior art.

TABLE 2

|  | Examples | | | | |
|---|---|---|---|---|---|
|  | 12 | 13 | 14 | 15 | 16 |
| Composition |  |  |  |  |  |
| PBT (%) | 56 | 56 | 56 | 54 | 54 |
| OCF 419 (%)* | 30 | 30 | 30 | 30 | 30 |
| EXAMPLE 1 (%) | — | — | 10.5 | — | — |
| EXAMPLE 2 (%) | — | — | — | 12 | — |
| Decabromodiphenyl Oxide (%) | — | 10.5 | — | — | 12 |
| Dechlorane ® Plus (%) | 10.5 | — | — | — | — |
| $Sb_2O_3$ (%) | 3.5 | 3.5 | 3.5 | 4 | 4 |
| Carbon Black (%) | 1 | 1 | 1 | 1 | 1 |
| Properties |  |  |  |  |  |
| Ul-94 ⅛" | V-0 | V-0 | V-0 | V-0 | V-0 |
| Tensile Strength (psi) | 14,142 | 16,493 | 13,926 | 15,277 | 16,729 |
| Notched Izod (ft-lbs/inch) | 1.35 | 1.30 | 1.29 | 1.08 | 1.27 |
| HDT (264 psi) | 386° F. | 383° F. | 382° F. | 367° F. | 391° F. |
| Bloom | Yes | Yes | No | No | Yes |

*Commercially available glass fiber manufactured by Owens Corning Fiberglass Corp.

Examples 17 and 18 illustrate inter alia the effect of molding temperature on the thermal stability of the molding compound following the procedure of Example 10. The molding temperature was 480° F. These results are summarized in Table 3 which also includes data on physical properties and flame retardance.

A comparison of the results of Examples 17 and 18 indicates that thermoplastic polyester molding compounds containing the flame retardant of Example 2 have more thermal stability, even at a higher loading, than those using the flame retardant of Example 1.

TABLE 3

|  | EXAMPLES | |
|---|---|---|
|  | 17 | 18 |
| Composition |  |  |
| PBT (%) | 52 | 56 |
| OCF 419 (%) | 30 | 30 |
| EXAMPLE 1 (%) | — | 10.5 |
| EXAMPLE 2 (%) | 13.5 | — |
| $Sb_2O_3$ (%) | 4.5 | 3.5 |
| Properties |  |  |
| UL-94 ⅛" | V-0 | V-0 |
| Tensile Strength (psi) | 14,989 | 14,594 |
| Notched Izod (ft-lbs/inch) | 1.06 | 1.43 |
| HDT (264 psi) | 368° F. | 383° F. |
| Color after molding | Off-white | Grey |

Examples 19 to 27 illustrate the effect on smoke generation of polyesterether molding compounds incorporating various flame retardants at various loading levels. The brominated bisimide used in the examples is the compound of formula IV disclosed in Column 5 of U.S. Pat. No. 4,374,220, where R is an ethyl group. This compound is sold by Saytech, Inc. and is designated as Satex ® BT-93.

The molding compounds of Examples 19 and 27 were prepared following the general procedure of Examples 3, 4 and 5, molded into test bars, and evaluated for some generation. The results are shown in Table 4. In the table, smoke density (Ds) was measured in a National Bureau of Standards smoke chamber using the ANSI/ASTM E-622-79 test method. The maximum possible smoke density rating of the smoke chamber was 924. Smoke density was measured at 90-second and 4-minute intervals.

The results shown in Table 4 demonsatrate the improvement in smoke generation obtained using the chlorinated bisimides of the present invention as compared to analogous compounds such as Dechlorane Plus ® and Satex ® BT-93.

TABLE 4

|  | EXAMPLES | | | | | | | | |
|---|---|---|---|---|---|---|---|---|---|
|  | 19 | 20 | 21 | 22 | 23 | 24 | 25 | 26 | 27 |
| Composition |  |  |  |  |  |  |  |  |  |
| Hytrel ® (parts) | 100 | 100 | 100 | 100 | 100 | 100 | 100 | 100 | 100 |
| EXAMPLE 1 (parts) | — | 12 | — | — | — | 60 | — | — | — |
| EXAMPLE 2 (parts) | — | — | 12 | — | — | — | 60 | — | — |
| Dechlorane Plus ® (parts) | — | — | — | 12 | — | — | — | 60 | — |
| Satex ® BT-93 (parts) | — | — | — | — | 12 | — | — | — | 60 |
| Fiberglas (parts) | 30 | 30 | 30 | 30 | 30 | 30 | 30 | 30 | 30 |
| $Sb_2O_3$ (parts) | 3 | 3 | 3 | 3 | 3 | 15 | 15 | 15 | 15 |
| Smoke Density |  |  |  |  |  |  |  |  |  |
| Ds (90 sec.) | 196 | 352 | 349 | 376 | 419 | 320 | 422 | 459 | 562 |
| Ds (4 min.) | 441 | 651 | 763 | 838 | 924 | 541 | 720 | 819 | 924 |
| Ds (max.) | 477 | 664 | 769 | 855 | 924 | 549 | 730 | 827 | 924 |

Examples 28, 29 and 30 illustrate the superior heat aging of the chlorinated bisimides of this invention in comparison to Satex ® BT-93. The molding compositions were molded into test bars following the general procedure of Examples 3, 4 and 5, and placed in an air circulating oven at 120° C. Physical properties were measured at 1-month and 2-month intervals. The results are shown in Table 5.

The results shown in Table 5 demonstrate the improvement in heat aging resulting from the use of the chlorinated bisimides of this invention as compared to analogous compounds such as the brominated bisimides of U.S. Pat. No. 4,374,220.

TABLE 5

|  | EXAMPLES | | |
| --- | --- | --- | --- |
|  | 28 | 29 | 30 |
| Composition |  |  |  |
| Hytrel ® (parts) | 100 | 100 | 100 |
| EXAMPLE 1 (parts) | 12 | — | — |
| EXAMPLE 2 (parts) | — | 12 | — |
| Satex ® BT-93 (parts) | — | — | 12 |
| $Sb_2O_3$ (parts) | 3 | 3 | 3 |
| Properties |  |  |  |
| Initial |  |  |  |
| Tensile Strength (psi) | 3044 | 2980 | 2904 |
| 300% Modulus (psi) | 1248 | 1200 | 1420 |
| Elongation (%) | 752 | 752 | 620 |
| 1 Month |  |  |  |
| Tensile Strength (psi) | 1704 | 1727 | 1545 |
| 300% Modulus (psi) | 1385 | 1397 | 1429 |
| Elongation (%) | 626 | 686 | 603 |
| 2 Months |  |  |  |
| Tensile Strength (psi) | 1607 | 1514 | Brittle |
| 300% Modulus (psi) | 1343 | 1346 |  |
| Elongation (%) | 623 | 606 |  |

What is claimed is:

1. An elastomeric flame retardant thermoplastic polyesterether composition comprising (a) from about 50% to about 90% by weight of a polyesterether elastomer prepared from dimethyl terephthalate, polyether glycol and 1,4-butanediol, (b) from about 0 to about 40% by weight of antimony trioxide, and (c) at least about 5% by weight of a chlorinated bisimide of the formula:

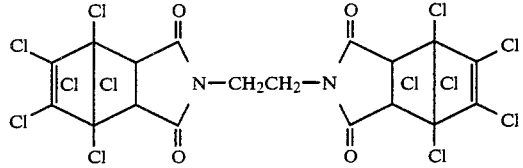

2. The composition of claim 1 wherein the polyesterether is present in an amount of from about 70% to about 90% by weight.

3. The composition of claim 1 wherein the chlorinated bisimide is present in an amount of from about 10% to about 15% by weight.

4. A molded article prepared from the composition of claim 1.

* * * * *